United States Patent
Stark et al.

(10) Patent No.: US 10,156,367 B2
(45) Date of Patent: Dec. 18, 2018

(54) RELOCATABLE CHILLER USER INTERFACE

(71) Applicant: Carrier Corporation, Jupiter, FL (US)

(72) Inventors: Michael A. Stark, Mooresville, NC (US); Hongwei Cai, Shanghai (CN); William Tony Slay, Chickamauga, GA (US)

(73) Assignee: CARRIER CORPORATION, Farmington, CT (US)

( * ) Notice: Subject to any disclaimer, the term of this patent is extended or adjusted under 35 U.S.C. 154(b) by 29 days.

(21) Appl. No.: 15/302,186

(22) PCT Filed: Apr. 10, 2015

(86) PCT No.: PCT/US2015/025242
§ 371 (c)(1),
(2) Date: Oct. 6, 2016

(87) PCT Pub. No.: WO2015/157598
PCT Pub. Date: Oct. 15, 2015

(65) Prior Publication Data
US 2017/0030596 A1    Feb. 2, 2017

(30) Foreign Application Priority Data

Apr. 11, 2014  (CN) .......................... 2014 1 0145490

(51) Int. Cl.
*F25D 23/12*  (2006.01)
*F24F 1/02*  (2011.01)
(Continued)

(52) U.S. Cl.
CPC ............. *F24F 1/022* (2013.01); *F16M 11/10* (2013.01); *F16M 11/24* (2013.01); *F16M 13/02* (2013.01);
(Continued)

(58) Field of Classification Search
CPC .... F24F 13/20; F24F 1/02; F24F 1/022; F24F 11/00; F24F 11/52; F16M 11/24; F16M 13/02
(Continued)

(56) References Cited

U.S. PATENT DOCUMENTS 4,511,432 A * 4/1985 Sephton ............... B01D 1/0082
                                                159/47.1
4,941,330 A * 7/1990 Williamson .............. F28B 1/02
                                                165/158
(Continued)

FOREIGN PATENT DOCUMENTS

EP         2495506 A1    9/2012
WO      2008075823 A2    6/2008

OTHER PUBLICATIONS

Notification of Transmittal of the International Search Report and the Written Opinion of the International Searching Authority, or the Declaration; Application No. PCT/US2015/025242; dated Jul. 3, 2015; 10 pages.

*Primary Examiner* — Melvin Jones
(74) *Attorney, Agent, or Firm* — Cantor Colburn LLP

(57) ABSTRACT

A heating, ventilation and air conditioning (HVAC) system includes a compressor, a condenser operably connected to the compressor, and an evaporator operably connected to the compressor and to the condenser. A relocatable interface panel is in operable communication with one or more components of the HVAC system to issue commands to the HVAC system via operator inputs at the interface panel. An electrical lead connects the interface panel to the one or more components. A plurality of installation points are located at the HVAC system for installation of the interface panel thereto. The interface panel is selectably installed to an
(Continued)

installation point of the plurality of installation points at an installation site of the HVAC system.

13 Claims, 5 Drawing Sheets

(51) Int. Cl.
*F24F 1/22* (2011.01)
*F16M 11/10* (2006.01)
*F16M 11/24* (2006.01)
*F16M 13/02* (2006.01)
*F24F 11/00* (2018.01)
*F24F 11/52* (2018.01)

(52) U.S. Cl.
CPC ............... *F24F 1/22* (2013.01); *F24F 11/00* (2013.01); *F24F 11/52* (2018.01)

(58) Field of Classification Search
USPC .............................................. 62/259.1, 498
See application file for complete search history.

(56) References Cited

U.S. PATENT DOCUMENTS

2007/0170827 A1* 7/2007 Frenia ................... F24F 1/0007
312/265.5
2009/0090115 A1 4/2009 Boydstun et al.

\* cited by examiner

RELOCATABLE CHILLER USER INTERFACE

CROSS REFERENCE TO RELATED APPLICATIONS

This application claims priority to PCT Patent Application No. PCT/US15/25242 filed Apr. 10, 2015 which claims priority to Chinese Patent Application No. 201410145490.4 filed Apr. 11, 2014 the entire contents of which is incorporated herein by reference.

BACKGROUND

The subject matter disclosed herein relates to heating, ventilation and air conditioning (HVAC) systems, such as chiller or chilled water units. More specifically, the subject matter disclosed chiller systems and chiller system interface panels.

A typical chiller includes a compressor, condenser, expansion device and an evaporator arranged in a vapor compression circuit. A flow of refrigerant is circulated through the system, and cools a medium flowing through evaporator tubes in the evaporator. The cooled medium is used to condition air in a selected space. The chiller includes an interface panel attached thereto, which allow an operator to input commands to chiller. In a typical chiller, this interface panel is located at a fixed location during manufacture. Upon delivery, the location and orientation of the chiller system in a space is often determined by the interface panel location, since it must be located to be accessible by the operator. Thus, other installation considerations, such as water piping routing and electrical system connection and routing are often more complicated due to the priority placed on interface panel location.

BRIEF SUMMARY

In one embodiment, a heating, ventilation and air conditioning (HVAC) system includes a compressor, a condenser operably connected to the compressor, and an evaporator operably connected to the compressor and to the condenser. A relocatable interface panel is in operable communication with one or more components of the HVAC system to issue commands to the HVAC system via operator inputs at the interface panel. An electrical lead connects the interface panel to the one or more components. A plurality of installation points are located at the HVAC system for installation of the interface panel thereto. The interface panel is selectably installed to an installation point of the plurality of installation points at an installation site of the HVAC system.

Alternatively or additionally, in this or other embodiments the interface panel is pivotably secured to the HVAC system.

Alternatively or additionally, in this or other embodiments the interface panel is secured to a tube sheet of one of the condenser or the evaporator.

Alternatively or additionally, in this or other embodiments the interface panel is secured to the tube sheet via a mounting system including a mounting bracket secured to the tube sheet and a mounting channel secured to the mounting bracket and secured to the interface panel.

Alternatively or additionally, in this or other embodiments the mounting bracket includes a plurality of securing locations for the mounting channel, to allow for adjustment in height of the interface panel toward a selected installed position.

Alternatively or additionally, in this or other embodiments the interface panel is secured to the tube sheet via a mounting system including a mounting rod secured to the tube sheet and a mounting sleeve through which the mounting rod extends, the mounting sleeve operably connected to the interface panel.

Alternatively or additionally, in this or other embodiments the mounting sleeve is rotatable about a mounting rod axis.

Alternatively or additionally, in this or other embodiments the mounting sleeve is translatable along a mounting rod axis.

Alternatively or additionally, in this or other embodiments the mounting sleeve is rotatably secured to the interface panel.

In another embodiment, a relocatable interface panel system for an HVAC system includes an interface panel in operable communication with the HVAC system to issue commands to the HVAC system via operator inputs at the interface panel. A mounting system secures the interface panel to one of a plurality of mounting locations at the HVAC system and includes a mounting bracket secured to the mounting location and a mounting channel secured to the mounting bracket and secured to the interface panel.

Alternatively or additionally, in this or other embodiments the mounting channel includes a slotted interface to the interface panel to allow for pivot of the interface panel.

Alternatively or additionally, in this or other embodiments the mounting bracket includes a plurality of securing locations for the mounting channel, to allow for adjustment in height of the interface panel toward a selected installed position.

Alternatively or additionally, in this or other embodiments the interface panel is connectable to the mounting channel at either lateral side of the interface panel.

Alternatively or additionally, in this or other embodiments the system includes an electrical lead extending from the interface panel to operably connect the interface panel to the HVAC system.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

Figure 1:
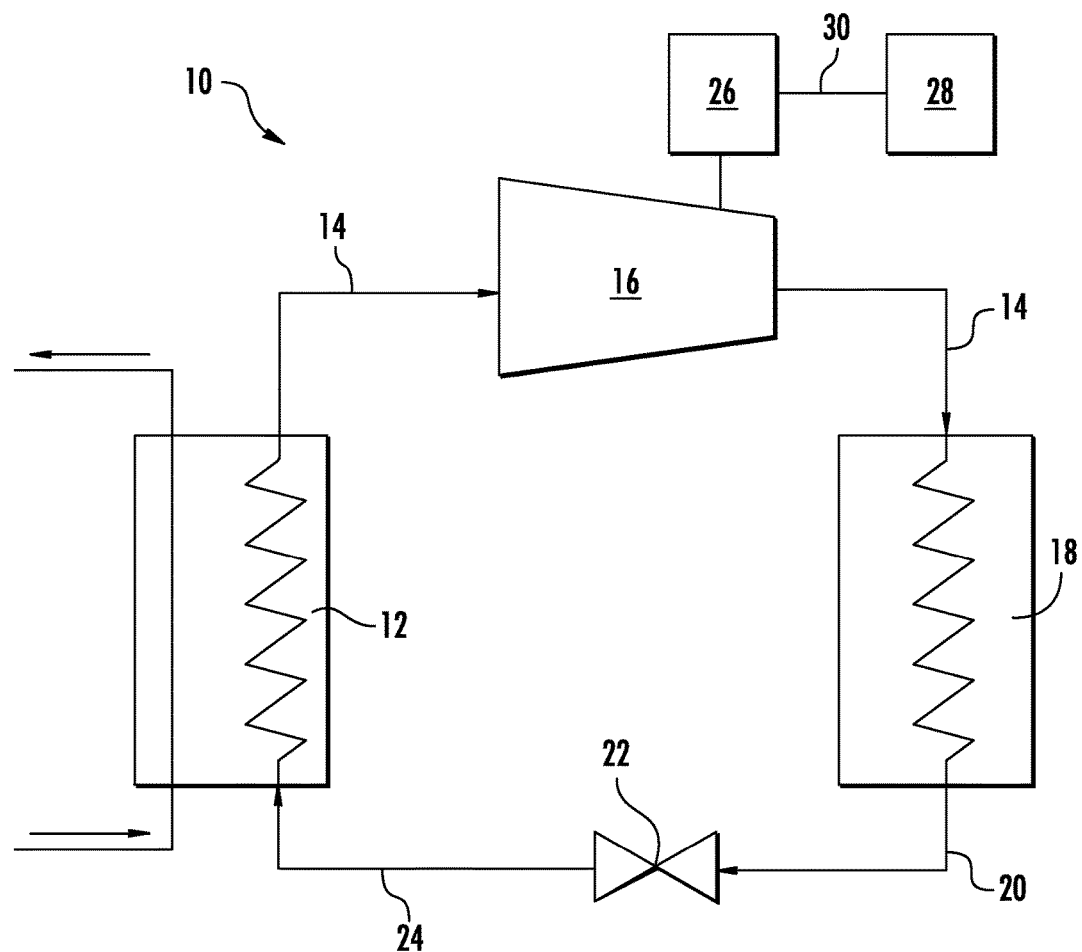
FIG. 1 is a schematic view of an embodiment of a chiller system.

The detailed description explains embodiments of the invention, together with advantages and features, by way of example with reference to the drawing.

DETAILED DESCRIPTION

Shown in FIG. 1 is a schematic view an embodiment of a heating, ventilation and air conditioning (HVAC) unit, for example, a chiller 10 using an evaporator 12. A flow of vapor refrigerant 14 is directed into a compressor 16 and then to a condenser 18 that outputs a flow of liquid refrigerant 20 to an expansion valve 22. The expansion valve 22 outputs a vapor and liquid refrigerant mixture 24 toward the evaporator 12. The compressor 16 may be, for example, a screw compressor, reciprocating compressor, scroll compressor, or a centrifugal compressor, and is driven by a prime mover, for example, an electric motor 26, and controlled by a user interface panel 28 operably connected to the compressor 16, in some embodiments via the electric motor 26.

Figure 2:
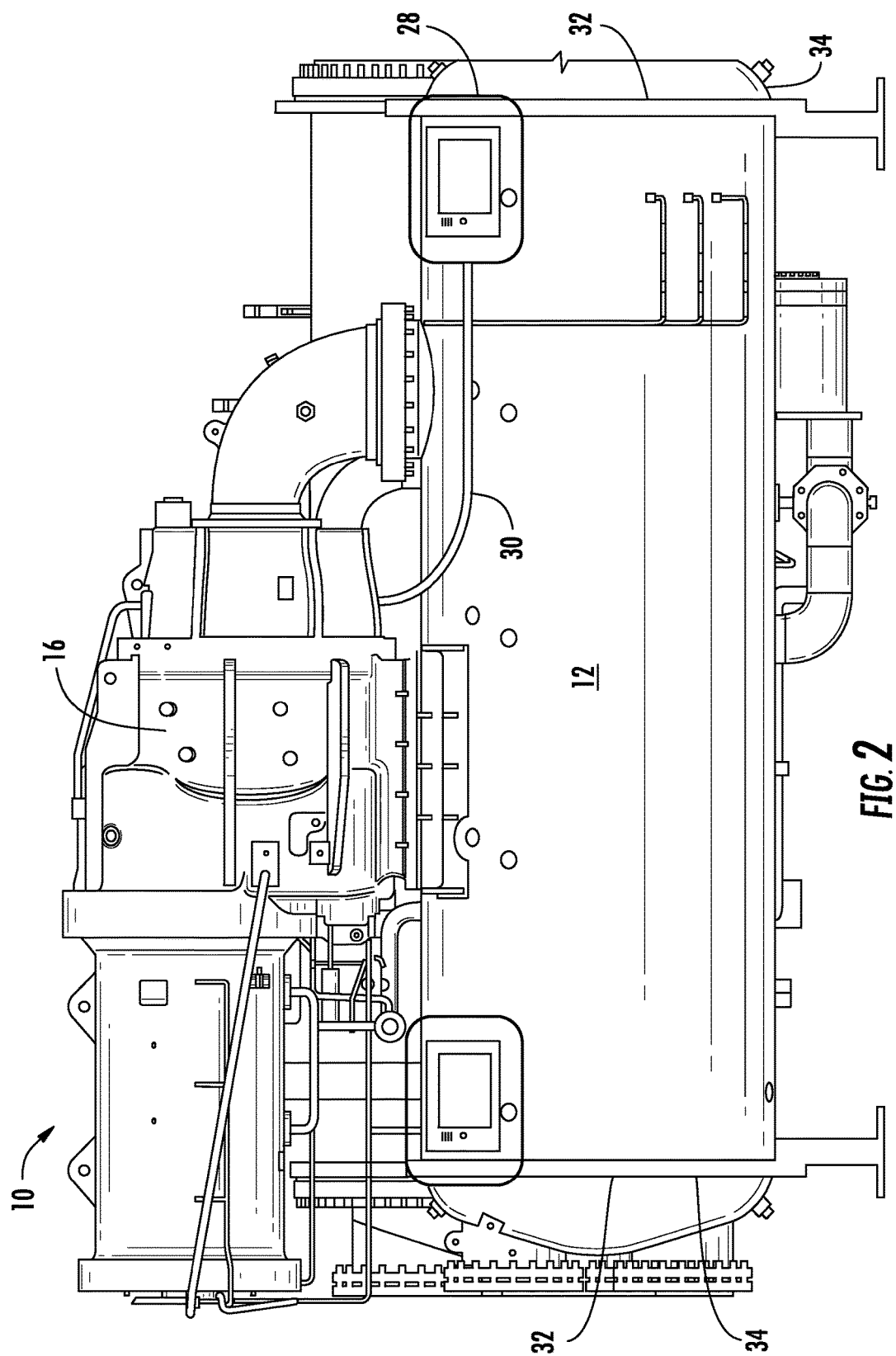
FIG. 2 is an elevation view of an embodiment of a chiller system.
Figure 3:
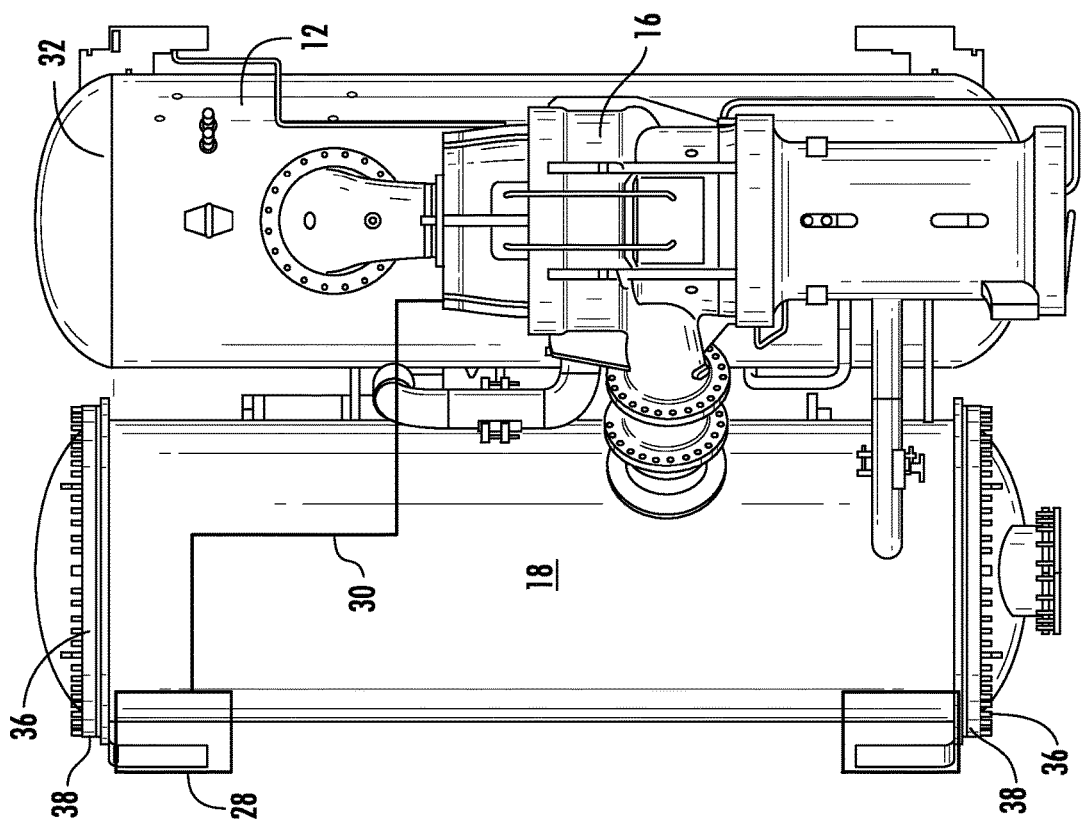
FIG. 3 is a plan view of an embodiment of a chiller system.

Referring to FIG. 2, the interface panel 28 is relocatable. As stated above, the interface panel 28 is operably connected to the compressor 16 and/or other components of the chiller 10 to control operation of the chiller 10 via instruction or commands input by an operator at the interface panel 28. The chiller includes a plurality of installation points for the interface panel 28, as will be discussed below, with the interface panel 28 selectably installed to one of the installation points at the installation site of the chiller 10 such that operator access to the interface panel 28 is assured. The connection is provided via an electrical lead or umbilical 30 extending from the interface panel 28 to the compressor 16 (and other components, as necessary). In one embodiment, the interface panel 28 is located at and secured to the evaporator 12 at, for example, an evaporator tube sheet 32. The evaporator tube sheets 32 support evaporator tubes (not shown) and are located at each evaporator end 34, and in some embodiments are also located intermittently along an evaporator length between the evaporator ends 34. In other embodiments, as shown in FIG. 3, the interface panel 28 is secured to the condenser 18 at a condenser tube sheet 36. The condenser tube sheets 36 are similarly located at condenser ends 38 and/or intermittently along a condenser length between condenser ends 38. As will be explained in more detail below, the interface panel 28 is configured to be secured at any of these locations through the use of common mounting hardware. Further, the provided umbilical 30 has sufficient length to reach any of the tube sheet 32, 36 locations. This provides the customer with increased flexibility in installation of the chiller 10 as the interface panel 28 may be relocated to suit the particular installation space and reduce the complexity of water and electrical routing and connections to the chiller system 10.

Figure 4:
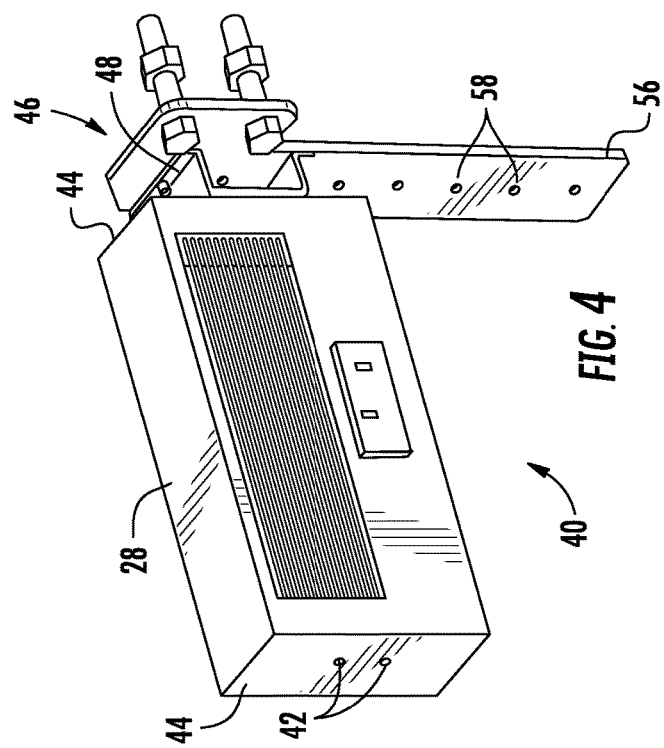
FIG. 4 is a perspective view of an embodiment of a movable interface panel and mounting system for a chiller system.
Figure 6:
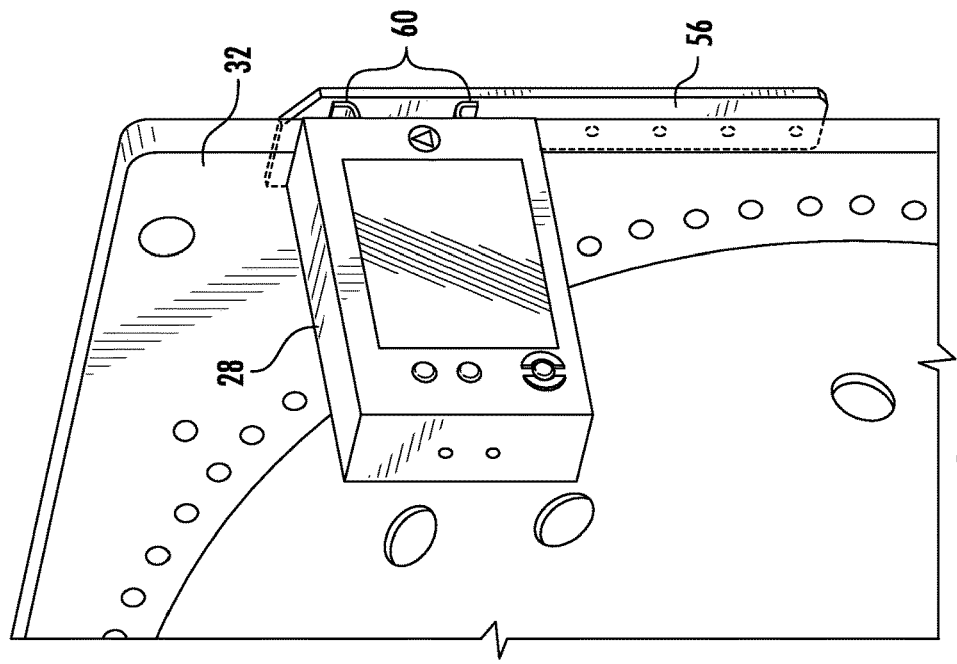
FIG. 6 is a perspective view of an embodiment of an interface panel installed to a chiller system.
Figure 5:
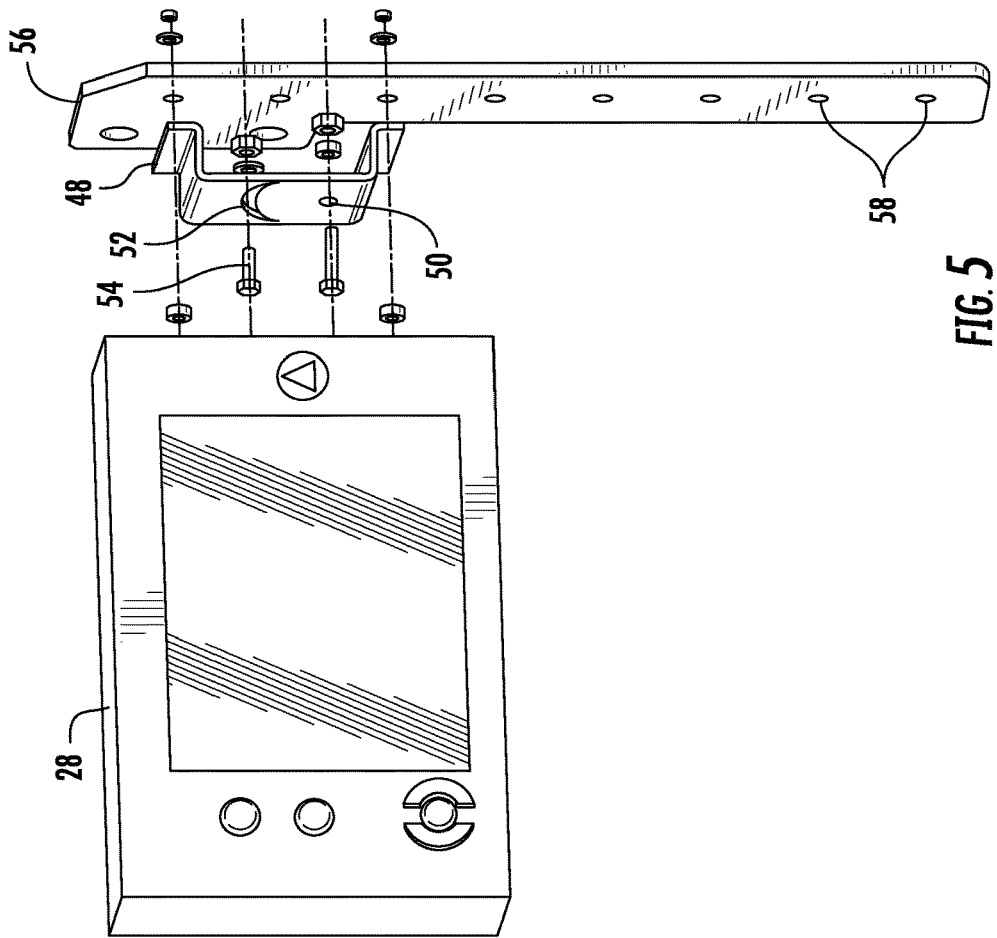
FIG. 5 is a partially exploded view of an embodiment of a movable interface panel and mounting system for a chiller system.

Referring now to FIG. 4, one embodiment of a mounting system 40 for the interface panel 28 is illustrated. The interface panel 28 includes mounting holes 42 at each lateral end 44 of the interface panel 28. The mounting holes 42 are used to secure the interface panel 28 to a mounting assembly 46. The mounting assembly 46 is configured to allow for selecting an installed height and an installation angle of the interface panel 28 relative to the chiller system 10. Referring now to FIG. 5, in this embodiment, the mounting assembly 46 includes a mounting channel 48 secured to the interface panel 28. The mounting channel 48 includes a circular channel hole 50 and a channel slot 52 through which respective channel bolts 54 extend to secure the interface panel 28 to the mounting channel 48. In the embodiment of FIG. 5, the channel slot 52 is arcuate to allow for pivot of the interface panel 28 to a selected installation angle. The mounting channel 48 is secured to a mounting bracket 56. The mounting bracket 56 may include an array of bracket holes 58 for connection of the mounting channel 48 to the mounting bracket 56 via, for example, screws or bolts (not shown). The bracket holes 58 provide flexibility in the installation height on the interface panel 28. While the mounting bracket 56, the mounting channel 48 and the interface panel 28 are illustrated and described herein having holes for connection of additional items, it will be readily appreciated by one skilled in the art that in other embodiments, one or more of the items may be provided with threaded studs or other fixing means attached thereto for installation of the additional item by, for example, installation of one or more nuts. Further, other methods may be used for attachment, without the use of bolts or nuts, such as a snap fit connection, hook and loop fasteners, or the like. Referring to FIG. 6, the mounting bracket 56 is secured to the evaporator tube sheet 32 or the condenser tube sheet 36 with mounting bolts 60 extending through existing tube sheet holes (not shown).

Figure 7:
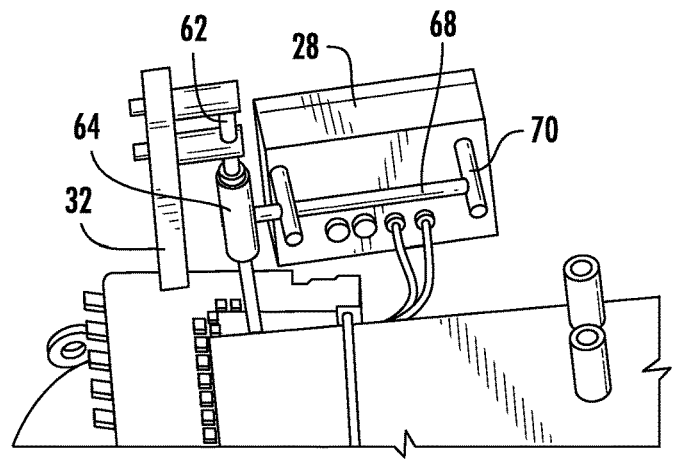
FIG. 7 is a perspective view of another embodiment of a movable interface panel and mounting system for a chiller system.
Figure 8:
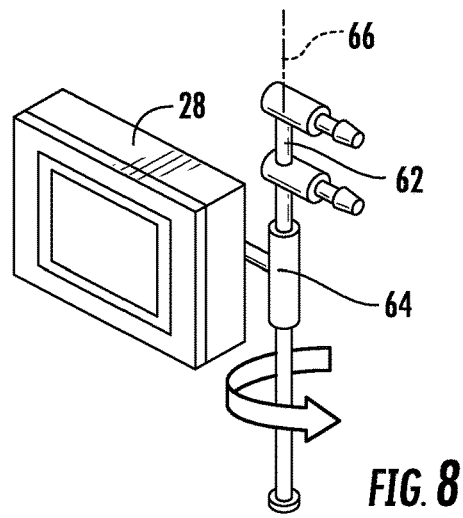
FIG. 8 is another perspective view of an embodiment of a movable interface panel and mounting system for a chiller system.
Figure 9:
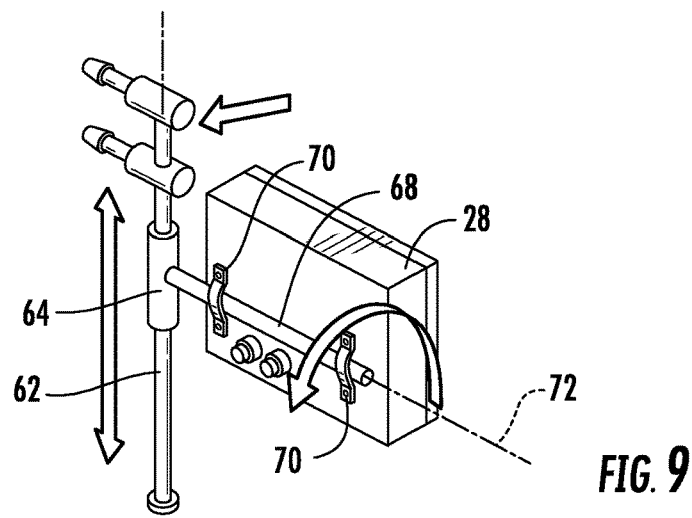
FIG. 9 is yet another perspective view of an embodiment of a movable interface panel and mounting system for a chiller system.

In another embodiment, shown in FIG. 7, the mounting system 40 uses a mounting rod 62 secured to the evaporator tube sheet 32 or the condenser tube sheet 36. The mounting rod 62 extends through a mounting sleeve 64, which as illustrated in FIG. 8, is rotatable about a mounting rod axis 66 and translatable along the mounting rod axis 66 to provide for movement of the interface panel 28 to a selected installation orientation. A panel rod 68 is attached to the mounting sleeve 64 and is connected to the interface panel 28 via one or more panel sleeves 70. The panel sleeve 70 and panel rod 68 arrangement allows for rotation of the interface panel 28 about a panel rod axis 72 for tilt of the interface panel 28, as shown in FIG. 9.

The mounting system disclosed herein allows for greater flexibility of customer installation of the chiller system 10 in the selected space via relocation of the interface panel 28 thereby reducing complexity of the accompanying water and/or electrical routing and connections to the chiller system 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A heating, ventilation and air conditioning (HVAC) system comprising:
   a compressor;
   a condenser operably connected to the compressor;
   an evaporator operably connected to the compressor and to the condenser;

a relocatable interface panel in operable communication with one or more components of the HVAC system to issue commands to the HVAC system via operator inputs at the interface panel;

an electrical lead to connect the interface panel to the one or more components; and a plurality of installation points at the HVAC system for installation of the interface panel thereto, the interface panel selectably installed to an installation point of the plurality of installation points at an installation site of the HVAC system;

wherein the interface panel is secured to a tube sheet of one of the condenser or the evaporator.

2. The HVAC system of claim 1, wherein the interface panel is pivotably secured to the HVAC system.

3. The HVAC system of claim 1, wherein the interface panel is secured to the tube sheet via a mounting system including:

a mounting bracket secured to the tube sheet; and a mounting channel secured to the mounting bracket and secured to the interface panel.

4. The HVAC system of claim 3, wherein the mounting bracket includes a plurality of securing locations for the mounting channel, to allow for adjustment in height of the interface panel toward a selected installed position.

5. The HVAC system of claim 1, wherein the interface panel is secured to the tube sheet via a mounting system including:

a mounting rod secured to the tube sheet; and a mounting sleeve through which the mounting rod extends, the mounting sleeve operably connected to the interface panel.

6. The HVAC system of claim 5, wherein the mounting sleeve is rotatable about a mounting rod axis.

7. The HVAC system of claim 5, wherein the mounting sleeve is translatable along a mounting rod axis.

8. The HVAC system of claim 5, wherein the mounting sleeve is rotatably secured to the interface panel.

9. A relocatable interface panel system for an HVAC system comprising:

an interface panel in operable communication with the HVAC system to issue commands to the HVAC system via operator inputs at the interface panel; and a mounting system to secure the interface panel to one of a plurality of mounting locations at the HVAC system including:

a mounting bracket secured to the mounting location; and a mounting channel secured to the mounting bracket and secured to the interface panel;

wherein the interface panel is configured to be secured to a tube sheet of one of a condenser or an evaporator of the HVAC system.

10. The interface panel system of claim 9, wherein the mounting channel includes a slotted interface to the interface panel to allow for pivot of the interface panel.

11. The interface panel system of claim 9, wherein the mounting bracket includes a plurality of securing locations for the mounting channel, to allow for adjustment in height of the interface panel toward a selected installed position.

12. The interface panel system of claim 9, wherein the interface panel is connectable to the mounting channel at either lateral side of the interface panel.

13. The interface panel system of claim 9, further comprising an electrical lead extending from the interface panel to operably connect the interface panel to the HVAC system.

* * * * *